(12) United States Patent
Rossberg et al.

(10) Patent No.: US 10,883,892 B2
(45) Date of Patent: Jan. 5, 2021

(54) CERAMIC PRESSURE MEASUREMENT CELL HAVING AT LEAST ONE TEMPERATURE TRANSDUCER AND PRESSURE SENSOR HAVING A PRESSURE MEASUREMENT CELL OF THIS TYPE

(71) Applicant: Endress + Hauser SE+Co. KG, Maulburg (DE)

(72) Inventors: Andreas Rossberg, Bad Sackingen (DE); Nils Ponath, Lorrach (DE); Jan Schleiferbock, Binzen (DE); Thomas Uehlin, Schopfheim (DE)

(73) Assignee: ENDRESS + HAUSER SE+CO. KG, Maulburg (DE)

( * ) Notice: Subject to any disclaimer, the term of this patent is extended or adjusted under 35 U.S.C. 154(b) by 190 days.

(21) Appl. No.: 16/061,824

(22) PCT Filed: Nov. 15, 2016

(86) PCT No.: PCT/EP2016/077745
§ 371 (c)(1),
(2) Date: Jun. 13, 2018

(87) PCT Pub. No.: WO2017/102217
PCT Pub. Date: Jun. 22, 2017

(65) Prior Publication Data
US 2018/0364125 A1 Dec. 20, 2018

(30) Foreign Application Priority Data
Dec. 18, 2015 (DE) .......................... 10 2015 122 220

(51) Int. Cl.
*G01K 7/04* (2006.01)
*G01L 19/02* (2006.01)
(Continued)

(52) U.S. Cl.
CPC ............ *G01L 19/0092* (2013.01); *G01K 7/04* (2013.01); *G01L 9/0075* (2013.01); *G01L 19/02* (2013.01); *G01L 19/04* (2013.01)

(58) Field of Classification Search
None
See application file for complete search history.

(56) References Cited

U.S. PATENT DOCUMENTS

| 3,948,102 A | 4/1976 | Coon |
| 4,141,252 A | 2/1979 | Lodge |

(Continued)

FOREIGN PATENT DOCUMENTS

| CN | 1662799 A | 8/2005 |
| CN | 1668486 A | 9/2005 |

(Continued)

OTHER PUBLICATIONS

Office Action dated Sep. 30, 2019 in corresponding Chinese application No. 201680073501.X.

(Continued)

*Primary Examiner* — Natalie Huls
*Assistant Examiner* — Jermaine L Jenkins
(74) *Attorney, Agent, or Firm* — Bacon & Thomas, PLLC (57) ABSTRACT

A pressure measurement cell comprises: a ceramic counter body; a ceramic measuring diaphragm which is joined in a pressure-tight manner with the counter body, creating a measurement chamber between the counter body and the measuring diaphragm, by means of a circumferential joint. The measuring diaphragm can be deformed by a pressure to be measured; an electrical converter for converting a pressure-dependent deformation of the measuring diaphragm into an electrical signal; and a temperature transducer for providing at least one electrical signal dependent on a temperature or on a temperature gradient of the pressure (Continued)

measurement cell. The temperature transducer comprises at least one first thermocouple having a galvanic contact between a first conductor with an electrically conductive material and a second conductor with at least one second electrically conductive material.

30 Claims, 4 Drawing Sheets

(51) Int. Cl.
*G01L 19/04* (2006.01)
*G01L 19/00* (2006.01)
*G01L 9/00* (2006.01)

(56) References Cited

U.S. PATENT DOCUMENTS

| | | | | |
|---|---|---|---|---|
| 4,668,374 | A * | 5/1987 | Bhagat | G01N 27/4071 204/412 |
| 5,050,034 | A * | 9/1991 | Hegner | G01L 9/0075 177/210 C |
| 6,374,680 | B1 * | 4/2002 | Drewes | G01L 9/0075 73/718 |
| 8,966,989 | B2 * | 3/2015 | Drewes | G01L 9/0075 73/718 |
| 9,958,350 | B2 * | 5/2018 | Ponath | G01L 9/0075 |
| 10,288,510 | B2 * | 5/2019 | Riou | G01L 9/0048 |
| 2002/0026835 | A1 | 3/2002 | Jacob et al. | |
| 2002/0026836 | A1 * | 3/2002 | Hegner | G01L 9/0075 73/717 |
| 2012/0024073 | A1 | 2/2012 | Guo | |
| 2012/0174681 | A1 | 7/2012 | Drewes et al. | |

FOREIGN PATENT DOCUMENTS

| | | |
|---|---|---|
| CN | 10 6134489 B | 10/2014 |
| CN | 104316260 A | 12/2015 |
| DE | 100 44 078 A1 | 4/2002 |
| DE | 10 2011 084 612 A1 | 4/2013 |
| DE | 10 2013 106 045 A1 | 12/2014 |
| DE | 10 2015 122 220 A1 | 6/2017 |
| EP | 1 186 875 A2 | 3/2002 |
| EP | 2 784 462 A1 | 10/2014 |
| SU | 1765732 A2 | 9/1992 |

OTHER PUBLICATIONS

German Search Report, German PTO, Munich, dated Aug. 9, 2016.
International Search Report, EPO, The Netherlands, dated Jan. 30, 2017.

* cited by examiner

CERAMIC PRESSURE MEASUREMENT CELL HAVING AT LEAST ONE TEMPERATURE TRANSDUCER AND PRESSURE SENSOR HAVING A PRESSURE MEASUREMENT CELL OF THIS TYPE

TECHNICAL FIELD

The present invention relates to a ceramic pressure measurement cell having at least one temperature transducer and a pressure sensor having a pressure measurement cell of this type.

BACKGROUND DISCUSSION

Temperature transducers or temperature sensors are often integrated into pressure measurement cells, in order to compensate for the static temperature error during pressure measurement. In generic pressure-measuring cells, this temperature sensor is typically arranged on the rear face of the ceramic; it can, however, be also contained inside connected evaluation electronics. If a pressure-measuring cell is in thermal equilibrium with its surroundings, the temperature dependence of the pressure measurement can be well compensated by means of such a temperature sensor and a suitable processing of the measurement signal. However, temperature jumps can lead to significant measuring errors, which can barely be compensated for using known methods. Especially in ceramic pressure measurement cells having a thin diaphragm that is attached to a counter body and that have a thickness of, for example, less than 100 μm, when there is a media-touching surface of about 1 cm² to 10 cm², the temperature of the measuring diaphragm follows the temperature of a medium on the measuring diaphragm at whatever speed is desired, whereas the heat, transfer between the front side and the rear side of the counter body follows only very slowly. This results in temperature gradients, and thus to associated mechanical stresses that adversely affect the pressure measurement.

German published, Patent application DE 100 44 078 A1 discloses a pressure measurement cell having two resistive temperature sensors that are to be arranged spaced apart in the direction of an expected temperature gradient. For this reason, the first temperature sensor is arranged at the measurement membrane that forms the front face of the pressure-measuring cell, where it can quickly follow the temperature changes of the medium, whereas the second temperature sensor is arranged at the rear face of the counter body of the pressure measuring cell and facing away from the measurement membrane.

Published German Patent application DE 10 2013 114 734 A1 discloses a pressure measurement cell in which the temperature of the measuring diaphragm is derived from the impedance of a measuring diaphragm electrode. This clearly enables the fastest detection of a temperature change. It is, however, associated with a greater evaluation effort.

SUMMARY OF THE INVENTION

The aim of the present invention is to provide a pressure measurement cell and a pressure sensor having a simple and reliable detection of temperature gradients.

The aim is achieved according to the invention by the pressure measurement cell.

The pressure measurement cell according to the invention comprises a ceramic counter body; a ceramic measuring diaphragm which is joined in a pressure-tight manner to the counter body, forming a measurement chamber between the counter body and the measuring diaphragm, via a circumferential joint, wherein the measuring diaphragm can be deformed by a medium to be measured; an electrical converter for converting a pressure-dependent deformation of the measuring diaphragm into an electrical signal; and a temperature transducer for providing at least one electrical signal dependent upon a temperature or upon a temperature gradient of the pressure measurement cell, characterized in that the temperature transducer has at least a first thermocouple that comprises a galvanic contact between a first conductor, which comprises a first electrically-conductive material, and a second conductor, which comprises at least a second electrically-conductive material.

In a further development of the invention, the counter body has a first material thickness ($h_g$), wherein the galvanic contact of the first thermocouple is separated from one of the surfaces of the membrane facing the counter body by no more than 25%—in particular, no more than 10%, and, preferably, no more than 5%—of the material thickness. In a further development of the invention, the joint has a material thickness ($h_g$), wherein the galvanic contact of the first thermocouple is separated from of one of the surfaces of the membrane facing the counter body by no more than ten times the second material, thickness—e.g., by no more than four times the material thickness—in particular, no more than double the second material thickness, and, preferably, no more than a second material thickness—of the joint.

The arrangement of the first thermocouple near the measuring diaphragm ensures a quick registration of temperature jumps that can arise, in particular, in the case of changing media temperatures in a process plant.

In a further development of the invention, the temperature transducer further has at least a second thermocouple, with a galvanic contact between the first conductor and a third conductor, which comprises at least a third electrically-conductive material.

This arrangement, permits the measurement of a second temperature or, if the first thermocouple and the second thermocouple are connected in series, the direct measurement of a temperature gradient. The second alternative, in particular, facilitates the correction of pressure measurement errors caused by temperature gradients.

Pressure measurement cell according to one of the preceding claims, wherein the first material is selected from a list that includes the following materials: metals, metallic alloys, metallic chalcogenides, metal oxides—in particular, sub-stoichiometric metal oxides—Si-compounds—in particular: CuNi, MV, Ti, TiW, TiBN(N2), TiTiN(N2), ZrNiTi, Ta/TaO, PtCu, Ta/TaO, TiOx, PbTe(SrTe)4Na2, Bi2Te3—Sb2Te3, Cu(2-x)Se, SrTiO3, SiGe.

In a further development of the invention, the first material has a Seebeck coefficient, with respect to Pt, whose magnitude amounts to not less than 2 μV/K—in particular, not less than 4 μV/K, preferably, not less than 8 μV/K, more preferably, not less than 16 μV/K, and, especially preferably, not less than 64 μV/K.

In a further development of the invention, the difference between the Seebeck coefficient of the first material and the Seebeck coefficient of the second material has a magnitude that amounts to not less than 2 μV/K—in particular, not less than 4 μV/K, preferably, not less than 8 μV/K, more preferably, not less than 16 μV/K, and, especially preferably, not less than 64 μV/K.

In a further development of the invention, the second conductor has several sections of different electrically-con ductive materials, wherein, preferably, the amount of the difference between the Seebeck coefficients of the respective adjacent, electrically-conductive materials of the second conductor amounts, to no more than half—in particular, no more than a quarter, and, preferably, no more than a tenth—of the amount of the difference between the Seebeck coefficient of the first material and the Seebeck coefficient of the second material, and/or wherein the third conductor has several sections of different electrically-conductive materials, wherein, preferably, the amount of the difference between the Seebeck coefficients of electrically-conductive materials of the third conductor amounts to no more than half—in particular, no more than a quarter, and, preferably, no more than a tenth—of the amount of the difference between the Seebeck coefficients of the first material and the Seebeck coefficients of the third material.

In a further development of the invention, the joint comprises the second electrically-conductive material, which contacts the electrically-conductive material of the first conductor, wherein the second electrically-conductive material comprises, in particular, an active hard solder, e.g., a Zr—Ni—Ti alloy, wherein the second conductor comprises the joint and a conductive section of the rear of the counter body, be it a shield on the outer surface of the counter body or an electrical transit in the counter body. This development is advantageous because temperature jumps in the medium pass into the counter body via the joint and can be most quickly detected via a thermocouple that encircles the joint.

In a further development of the invention, the counter body has a diaphragm-side end face and a rear face facing away from the measuring diaphragm that have an axial distance (a) from each other wherein the first conductor extends over at least 80%—in particular, at least 90%, preferably, at least 95%, and, especially preferably, at least over 100%—of the axial distance (a). Because a temperature gradient after a temperature jump runs, in particular, in an axial direction, the axial separation specified here is advantageous in enabling the determination of the temperature gradients with sufficient precision.

In a further development of the invention, the first conductor runs along an outer surface of the counter body, which outer surface extends between the diaphragm-side end face and the rear face. In an advantageous manner, the galvanic contact of the first thermocouple is arranged on an outer surface of the counter body.

In a further development of the invention, the counter body has a through hole or a blind hole between the diaphragm-side end face and the rear face, wherein the first conductor runs within the hole or the blind hole.

In a further development of the invention, the galvanic contact of the first thermocouple is arranged on a surface, of the counter body facing towards the measuring diaphragm, wherein, in particular, the surface of the counter body facing towards the measuring diaphragm has a radius wherein the galvanic contact is at a distance of no more than a fifth of the radius—in particular, no more than a tenth of the radius—from the outer surface of the counter body.

In a further development of the invention, the second thermocouple is at a distance of no more than 20%—in particular, no more than 10%, and, preferably, no more than 5%—of the axial distance from the rear face and is preferably arranged on the rear face.

In a further development of the invention, the electrical converter is a capacitive converter that has a diaphragm electrode (7) arranged on the measuring diaphragm and at least one counter body electrode (8, 9) arranged on the diaphragm-side face of the counter body (2), wherein the capacitance between the diaphragm electrode (7) and the counter body electrode (8, 9) depends upon a pressure-dependent deformation of the measuring diaphragm, wherein the counter body electrode comprises the first or the second material.

In a further development of the invention, at least one conductor of the first and/or second thermocouple is deposited on the counter body—in particular, by sputtering.

The pressure measurement cell according to the invention comprises: a pressure measurement cell according to one of the preceding claims; and a housing, wherein the housing, in its interior, has a measurement cell chamber, in which the pressure measurement cell is arranged, wherein the housing has a media port, wherein the measuring diaphragm faces the media port and can be acted upon via the media port by a medium whose pressure is to be measured.

In a further development of the invention, the media port is surrounded by an annular seal seat, wherein a seal ring is arranged between the seal seat and the pressure measurement cell, wherein the pressure measurement cell is clamped in an axial direction against the seal ring by a clamping device.

In a further development of the invention, the pressure-measuring detector is arranged in such a manner that—after a temperature jump of a fluid medium of at least +80 K, before which the medium had an initial temperature of 300 K+/−10 K and the pressure-measuring detector was found to be in thermal equilibrium with the medium and the environment—the counter body has an inhomogeneous temperature distribution, with sites of maximum temperature and minimum temperature, wherein the first thermocouple and the second thermocouple are arranged in such a manner that, over a time span of 60 seconds to 600 seconds—in particular, of 30 seconds to 600 seconds, and, preferably, of 15 seconds to 600 seconds—after the temperature jump, the difference between a current first temperature at the site of the galvanic contact of the first thermocouple and a current second temperature at the site of galvanic contact of the second thermocouple amounts to not less than 20%—in particular, not less than 40%, and, preferably, not less than 50%—of the difference between the current maximum temperature and the current minimum temperature.

In a further development of the invention, the pressure-measuring detector is arranged in such a manner that—after a temperature jump of a fluid medium of at least +80 K, before which the medium had an initial temperature of 300 K+/−10 K, and the pressure-measuring detector was found to be in thermal equilibrium with the medium and the environment—the counter body has an inhomogeneous temperature distribution, with sites of maximum temperature and minimum temperature, wherein the first thermocouple is arranged in such a manner that, over a time span of 60 seconds to 600 seconds—in particular, of 30 seconds to 600 seconds, and, preferably, of 15 seconds to 600 seconds—after the temperature jump, the amount of the difference between the current maximum temperature and a current first temperature at the site of the galvanic contact of the first thermocouple amounts to no more than 50%—in particular, no more than 40%, and, preferably, no more than 20%—of the difference between the current maximum temperature and the current minimum temperature.

The invention is explained in the following in further detail on the basis of the exemplary embodiments shown in the figures. Illustrated are:

BRIEF DESCRIPTION OF THE DRAWINGS

The invention is explained in the following in further detail on the basis of the exemplary embodiments shown in the figures. Illustrated are:

FIG. 1b: is a view of diaphragm-side front end of a counter body of the exemplary embodiment from FIG. 1a;

FIG. 2b: is a view of a diaphragm-side front end of a counter body of the exemplary embodiment from FIG. 2a;

FIG. 2c: is a view of a diaphragm-side front end of a counter body of the exemplary embodiment from FIG. 2a;

FIG. 3b: is a view of a diaphragm-side front end of a counter body of the exemplary embodiment from FIG. 3a;

DETAILED DISCUSSION IN CONJUNCTION WITH THE DRAWINGS

Figure 1A:
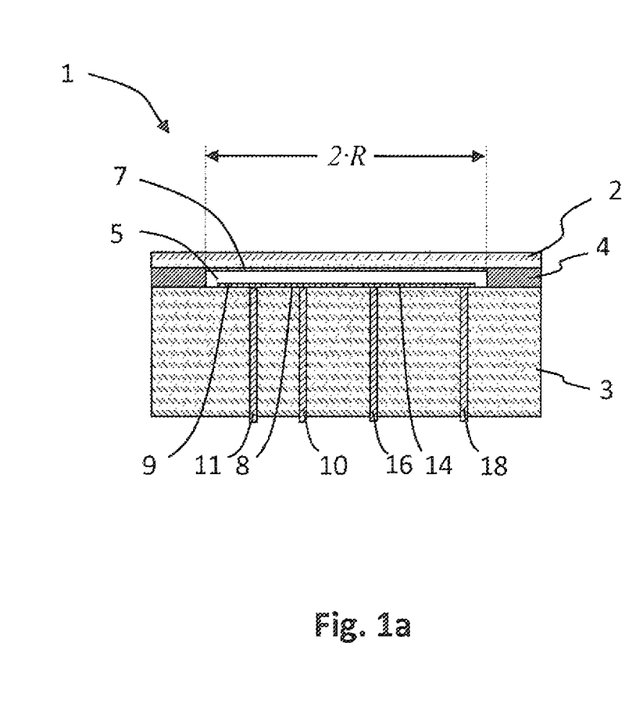
FIG. 1a: is a longitudinal cut through a first exemplary embodiment of a pressure measurement cell according to the invention.
Figure 1B:
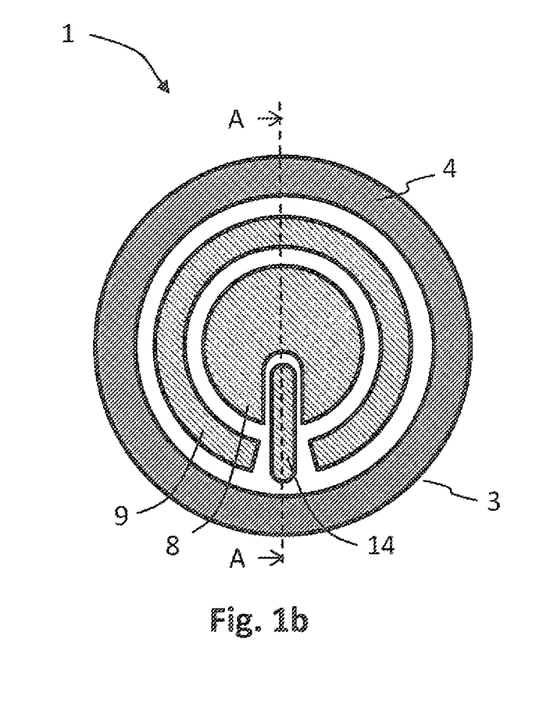

An exemplary embodiment represented in FIGS. 1a and 1b of a pressure measurement cell 1 according to the invention comprises a circular disc-shaped, ceramic measuring diaphragm 2 that is joined in a pressure-tight manner to a significantly stiffer, circular disc-shaped, ceramic counter body 3 along a peripheral circumferential joint 4, creating a measurement chamber 5 between counter body 3 and measuring diaphragm 2. Measuring diaphragm 2 and the counter body comprise corundum in particular. The joint may especially comprise an active hard solder for example, a Zr—Ni—Ti active hard solder.

Measuring diaphragm 2 has, on its counter body-side surface, a full-surface diaphragm electrode 7 having a radius R, wherein R is the radius of the deflectable region of the measuring diaphragm, which radius corresponds to the inner diameter of joint 4. On a diaphragm-side end of counter body 3, a central measuring electrode 8 is arranged that is surrounded, section-wise, by a reference electrode 9. The distance of the reference electrode 9 to the measuring electrode 8 and the joint 4 is about 0.1 R each. The reference electrode 9 and the measuring electrode 8 are in electrical contact via metallic transits 10, 11 through the base body. The membrane electrode 7 may, for example, be placed on switching ground via the joint. For determining a pressure measurement value, the capacitances between the measurement electrode 8 and the membrane electrode 7, on the one hand, and the reference electrode 9 and the membrane electrode 7, on the other hand, are captured. If the capacitances of the measuring electrode and the reference electrode are each the same with respect to the diaphragm electrode when the same pressure prevails in the measurement chamber and on the outer side of the measuring diaphragm facing away from the measuring diaphragm, the pressure to be measured can then be easily determined on the basis of a differential signal of the capacitances. Details on determining a pressure measurement value using the capacitances are known and described in the published German patent application DE 10 2011 078 557 A1.

For the determination of a temperature or of a temperature gradient on the diaphragm-side face of outer body 3, pressure measurement cell 1 has a temperature transducer with two thermocouples. The two thermocouples comprise, as a common first conductor 14, a strip of $TiO_{2-x}$ that is deposited on the diaphragm-side face of counter body 3 via, for example, a sputter process. The first conductor is electrically insulated with respect to measurement electrode 8, reference electrode 9, and joint 4 and extends in the radial direction from a first position in the edge region of the measurement chamber to a second position close to the center. Details on contacting the first conductor 14 are illustrated, in particular, in FIG. 1a, which shows a longitudinal section along the line A-A in FIG. 1b.

A first of the two thermocouples additionally comprises a first Ta pin 18 as a second conductor, which is guided through an axial hole from a rear side of counter body 3 to the first position on the diaphragm-side face of the counter body, and there contacts first conductor 14.

A second of the two thermocouples additionally comprises a second Ta pin 16 as a second conductor, which is guided through an axial hole from a rear side of counter body 3 to the second position on the diaphragm-side face of the counter body, and there contacts first conductor 14.

Temperature jumps in the medium, as they arise because of the SIP process in particular, are introduced by measuring diaphragm 2 via joint 4 into counter body 3 of the pressure measurement cell. This results in temperature gradients between the first position of first conductor 14 and the second position of the first conductor. Different thermoelectromotive forces, whose differential can be established on the rear face between first Ta pin 18 and second Ta pin 16, are thus produced on the two Ta pins at the first or second position.

In an alternative design of this exemplary embodiment (not depicted here), first Ta pin 18 can be omitted if the first conductor is brought up to joint 4 and contacts this galvanically. The outside or outer surface of joint 4 is then contacted with a metallic coating that extends across the outer surface of counter body 3 to the rear face. A signal, which depends upon the temperature differential between the first position of the first conductor on the edge of the measurement chamber and the second position of the first conductor in a central region of the diaphragm-side face of the counter body, can then be picked up on the rear face between the metallic coating and second Ta pin 16. A prerequisite for this is that the material of the first conductor have a significantly higher Seebeck coefficient than the material of the joint and the material of the metallic coating.

Figure 2A:
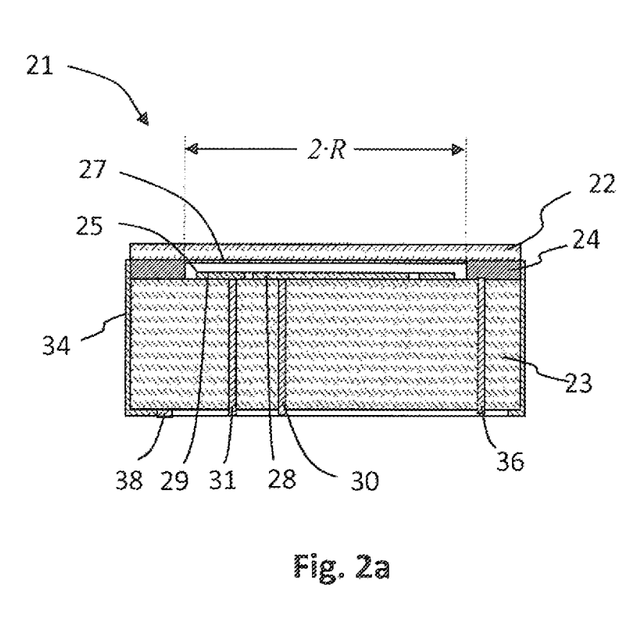
FIG. 2a: is a longitudinal cut through a second exemplary embodiment of a pressure measurement cell according to the invention.
Figure 2B:
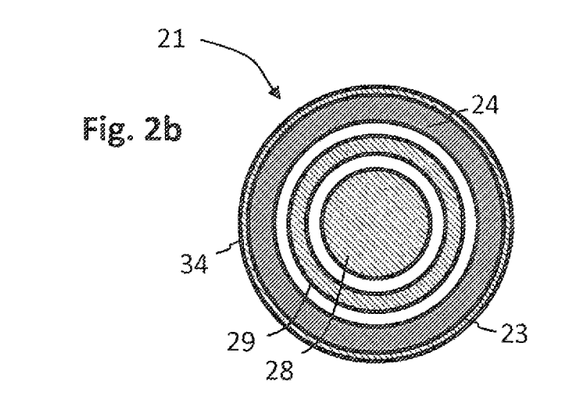
Figure 2C:
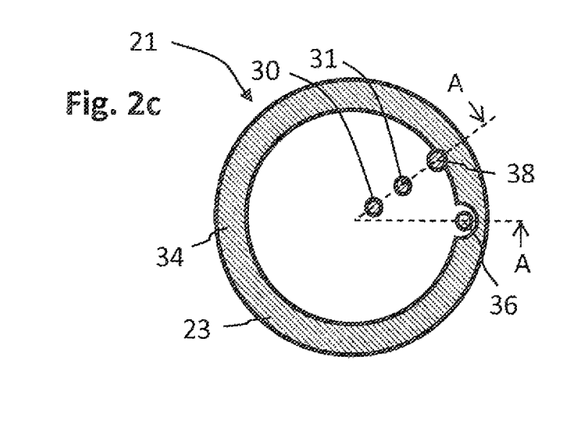

The exemplary embodiment, represented in FIGS. 2a through 2c, of pressure measurement cell 21 according to the invention comprises a circular disc-shaped, ceramic measuring diaphragm 22 that is joined in a pressure-tight manner to a significantly stiffer, circular disc-shaped, ceramic counter body 23 along a circumferential joint 24, creating a measurement chamber 25 between counter body 23 and measuring diaphragm 22. Measuring diaphragm 22 and counter body 23 comprise corundum in particular. The joint comprises an active hard solder—for example, Zr—Ni—Ti.

Membrane electrode 22 has a full-surface diaphragm electrode 27 on its counter body-side surface. On a diaphragm-side face of counter body 23, a central measuring electrode 28 is arranged that is annularly surrounded by a reference electrode 29. Reference electrode 29 and measuring electrode 28 are electrically contacted via metallic transits 30, 31 through the counter body. Membrane electrode 27 is grounded via the joint. To determine a pressure measurement value, the capacitances are determined and evaluated, as was explained in connection with the first exemplary embodiment.

To determine a temperature or a temperature gradient on the diaphragm-side face of counter body 23, pressure measurement cell 21 has a temperature transducer with two thermocouples. As a common first conductor 34, the two thermocouples include a coating on the outer surface having a first material that has a sufficiently large Seebeck coefficient, e.g., $TiO_{2-x}$, MV, or CuNi, and, is deposited via a sputter process. First conductor 34 is in galvanic contact with the outer surface of joint 24, which has a second conductor in the form of the active solder, so that the first thermocouple of the temperature transducer is formed at this contact. The layer of first conductor 34 extends up to the rear face of counter body 23. First conductor 34 here galvanically contacts a second conductor in the form of a metallic contact pad 38, whereby the second thermocouple of the temperature transducer is formed. To be able to access the potential of the first thermocouple, a Ta pin 36 extends through counter body 23 and contacts joint 24.

Details on contacting first conductor 14 are illustrated, in particular, in FIG. 2a, which shows a longitudinal section along the line A-A in FIG. 2c.

The differential between the thermaelectromotive voltages of the first and the second thermocouples is determined between Ta pin 36 and the contact pad 38.

In the second exemplary embodiment, first conductor 34 is illustrated as a full-surface coating of the outer surface, so that this coating, if it has, sufficiently good conductivity, can simultaneously serve as a shield for measuring electrode 28 and reference electrode 30.

If the specific resistance of the first conductor is too great to still serve as a shield, an insulation layer (for example, SiO2) can also be deposited on the first conductor in the axial region of the outer surface, on which insulation layer a metallic shielding layer is deposited that contacts the joint or the first conductor in the region of the joint. In this case, it is not necessary for the first conductor to cover the entire outer surface of the counter body. It is sufficient if a strip extends from the joint in the axial direction up to the contact pad on the rear of the counter body.

Figure 3A:
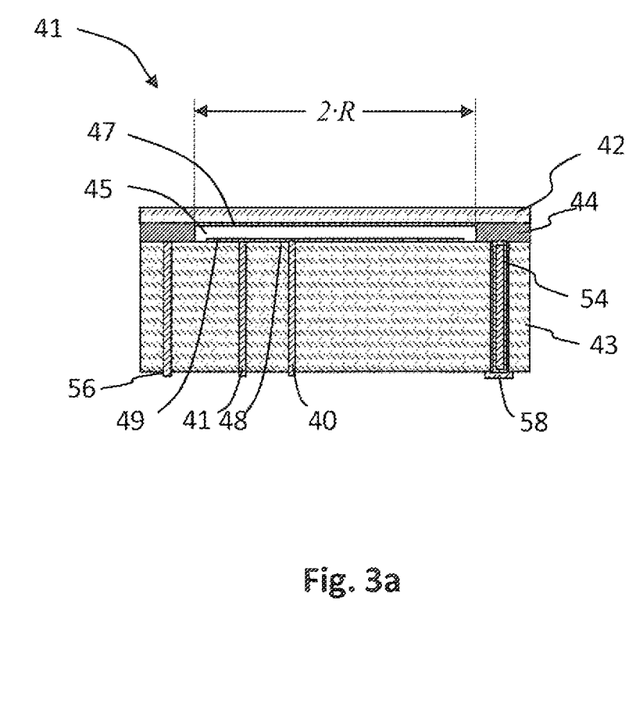
FIG. 3a: is a longitudinal cut through a third exemplary embodiment of a pressure measurement cell according to the invention.
Figure 3B:
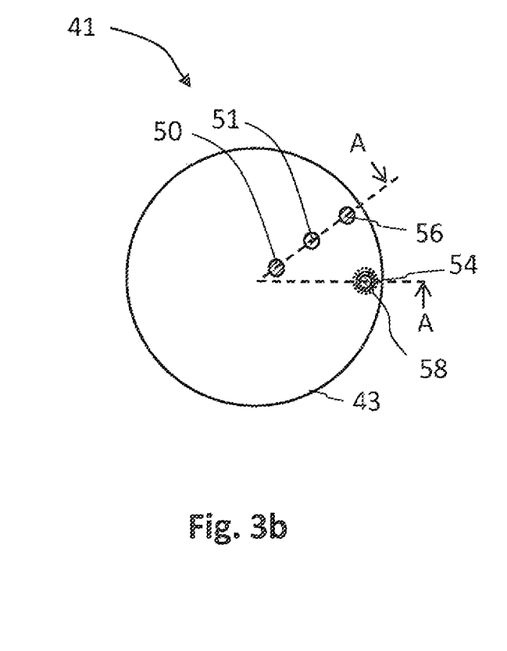

The third exemplary embodiment shown in FIGS. 3a and 3b of a pressure measurement cell 41 according to the invention comprises a circular disc-shaped, ceramic measuring diaphragm 42 that is joined in a pressure-tight manner to a significantly stiffer, circular disc-shaped, ceramic counter body 43 along a circumferential joint 44, creating a measurement chamber 45 between counter body 43 and measuring diaphragm 42. Measuring diaphragm 42 and counter body 43 comprise corundum in particular. The joint comprises an, active hard solder—for example, Zr—Ni—Ti.

Measuring diaphragm 42 has a full-surface diaphragm electrode 47 on its counter body-side surface. On a diaphragm-side end of counter body 43, a central measuring electrode 48 is arranged that is annularly surrounded by a reference electrode 49. Reference electrode 49 and measuring electrode 48 contact electrically via metallic transits 50, 51 through the counter body.

Membrane electrode 47 is grounded via the joint. To determine a pressure measurement value, the capacitances are determined and evaluated, as was explained in the first exemplary embodiment.

To determine a temperature or a temperature gradient on the diaphragm-side face of counter body 43, pressure measurement cell 41 has a temperature transducer with two thermocouples. The two thermocouples comprise a common first conductor in the form of a coating 54 on the outer surface and on the face of a corundum pin with a first material that has a sufficiently large Seebeck coefficient, e.g., $TiO_{2-x}$, and is deposited via a sputter process. The corundum pin is inserted in a pass-through axial hole through the counter body, so that coating 54 is in galvanic contact with the underside of joint 44, where the axial hole through the counter body exits. Advantageously, the ceramic pin is joined to the joint via the same joining process in which the measuring diaphragm is joined to the counter body. Whereby the galvanic contact between joint 44 and coating 54, via which the first thermocouple is formed, is reliably secured.

On a rear side, facing away from the diaphragm, of counter body 43, the second galvanic contact to first coating 54 is formed on the corundum pin via a soldered contact pad 58, whereby the second thermocouple of the temperature transducer is realized. To be able to access the potential of the first thermocouple, a Ta pin 56 extends through counter body 43 and contacts joint 44.

Details on the connection of first conductor 54 are illustrated, in particular, in FIG. 3a, which shows a longitudinal section along line A-A in FIG. 3b.

The differential between the thermoelectromotive voltages of the first and the second thermocouples is determined between Ta pin 56 and the contact pad 58.

In an alternative design of this exemplary embodiment, Ta pin 56 can be omitted if the outside or outer surface of joint 4 contacts a metallic coating that extends over the outer surface of counter body 43 to the rear face. A signal that depends upon the temperature differential between the two thermocouples is then established on the rear face between the metallic coatings and the second Ta pin contact pad 58.

Figure 4:
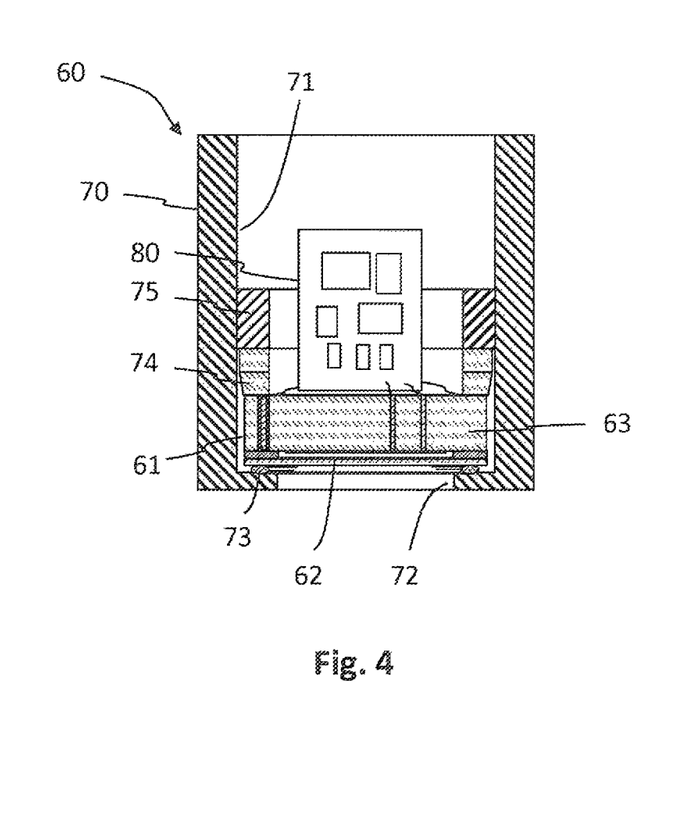
FIG. 4: is a schematic longitudinal cut through an exemplary embodiment of a pressure measurement cell according to the invention.

The exemplary embodiment of a pressure-measuring detector 60 according to the invention shown in FIG. 4 comprises a pressure measurement cell 61 according to the invention having a measuring diaphragm 62 and a counter body 63. A temperature transducer having two thermocouples and a capacitive transducer, wherein the details of the temperature transducer and the capacitive transducer of the previously discussed exemplary embodiments corresponding apply here.

Pressure-measuring detector 60 further comprises a cylindrical, metallic housing 70, which, in its interior, has a measuring cell chamber 71 that can be acted upon, via an end face-side opening 72, by a medium whose pressure is to be, measured. Opening 72 is surrounded by a circumferential seal seat that forms an axial stop surface. A seal ring 73, against which the pressure measurement cell is axially clamped, is positioned between measuring, diaphragm 62 of pressure measurement cell 61 and the seal seat. For this purpose, a ceramic support ring 74 first acts on the rear side of counter body 63 of measurement cell 61, which ceramic support ring is, for its part, supported on the rear side by a metallic screw ring 75 that engages in the threads in the wall of measurement cell chamber 71.

The capacitive transducer and the temperature transducer are connected to an operating circuit 80, wherein the operating circuit is arranged on or near the rear side of pressure measurement cell 61. The operating circuit evaluates the signals of the transducer and prepares them for further processing. Operating circuit 80 can have, in particular, an ASIC.

Figure 5:
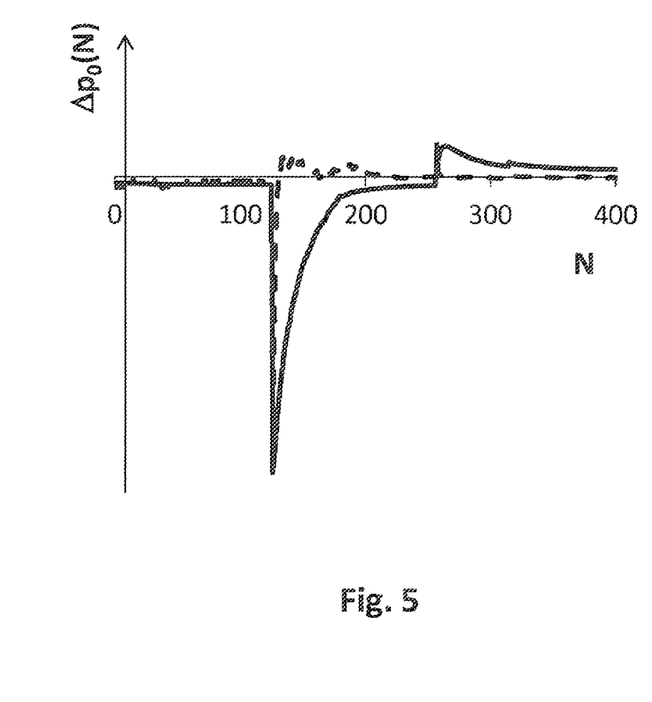
FIG. 5: is the pressure signal of the pressure zero point during temperature jumps, without and with compensation for the temperature gradient.

The temperature compensation or the temperature gradient compensation, in particular, is part of the further processing of the signal. For this purpose, FIG. 5 shows an exemplary data set for a pressure measurement value, determined on the basis of the capacitances, at p=0 for a positive temperature jump and a negative temperature jump of 80 K over N=400 measurement points at an interval of 15 seconds each. The solid line shows the pressure measurement value without temperature compensation. The dashed line shows the pressure measurement value with temperature compensation, wherein the temperature gradient between the outer surface of the joint and the rear side of the pressure measuring cell was taken into account for this purpose. The first conductor that enters into the two thermocouples was, in this case, the shielding coating of the outer surface of the pressure measurement cell. It can be recognized in the result that the zero-point fluctuations of the pressure signal could be significantly reduced.

The invention claimed is:

1. A pressure measurement cell, comprising:
a ceramic counter body;
a ceramic measuring diaphragm which is joined in a pressure-tight manner to said ceramic counter body, forming a measurement chamber between said ceramic counter body and said ceramic measuring diaphragm, via a circumferential joint said ceramic measuring diaphragm can be deformed by a pressure to be measured;
an electrical converter for converting a pressure-dependent deformation of said ceramic measuring diaphragm into an electrical signal; and
a temperature transducer for providing at least one electrical signal dependent upon a temperature or upon a temperature gradient of the pressure measurement cell, wherein:
in that said temperature transducer comprises at least one first thermocouple having a galvanic contact between a first conductor, which comprises a first electrically-conductive material, and a second conductor, which comprises at least a second electrically-conductive material that contacts said first conductor.

2. The pressure measurement cell according to claim 1, wherein:
said ceramic counter body has a first material thickness;
the galvanic contact of said at least one first thermocouple is separated from one of the surfaces of a membrane facing said ceramic counter body by no more than 25%.

3. The pressure measurement cell according to claim 1, wherein the temperature transducer further has at least a second thermocouple, with a galvanic contact between the first conductor and a third conductor, which comprises at least a third electrically conductive material, which contacts the first conductor.

4. The pressure measurement cell according to claim 3, wherein:
said first thermocouple and said second thermocouple are connected in series.

5. The pressure measurement cell according to claim 3, wherein:
said second thermocouple is at a distance of no more than 20% of the axial distance from the rear face and is preferably arranged on the rear face.

6. The pressure measurement cell according to claim 3, wherein: said second thermocouple is at a distance of no more than 10% of the axial distance from the rear face.

7. The pressure measurement cell according to claim 3, wherein: said second thermocouple is arranged on the rear face.

8. The pressure measurement cell according to claim 3, wherein: at least one conductor of said first and/or said second thermocouple is deposited on said counter body.

9. The pressure measurement cell according to claim claim 1, wherein:
said first material is selected from a list that includes the following materials: metals, metallic alloys, metallic chalcogenides, metal oxides.

10. The pressure measurement cell according to claim 1, wherein:
said first material has a Seebeck coefficient, with respect to Pt, whose magnitude amounts to not less than 2 µV/K; and/or
the difference between the Seebeck coefficient of said first material and the Seebeck coefficient of said second material has a magnitude that amounts to not less than 2 µV/K.

11. The pressure measurement cell according to claim 1, wherein:
said second conductor has several sections of different electrically-conductive materials, wherein the amount of the difference between the Seebeck coefficients of the respective adjacent, electrically-conductive materials of said second conductor amounts to no more than half of the amount of the difference between the Seebeck coefficient of the first material and the Seebeck coefficient of the second material; and/or
said third conductor has several sections of different electrically-conductive materials, wherein the amount of the difference between the Seebeck coefficients of electrically-conductive materials of said third conductor amounts to no more than half of the amount of the difference between the Seebeck coefficients of said first material and the Seebeck coefficients of said third material.

12. The pressure-measuring detector according to claim 11, wherein:
the pressure-measuring detector is arranged in such a manner that after a temperature jump of a fluid medium of at least +80 K, before which the medium had an initial temperature of 300 K+/−10 K, and the pressure-measuring detector was found to be in thermal equilibrium with the medium and the environment—the counter body has an inhomogeneous temperature distribution, with sites of maximum temperature and minimum temperature;
said first thermocouple is arranged in such a manner that, over a time span of 60 seconds to 600 seconds after the temperature jump, the amount of the difference between the current maximum temperature and a current first temperature at the site of said galvanic contact of said first thermocouple amounts to no more than 50% of the difference between the current maximum temperature and the current minimum temperature.

13. The pressure measurement cell according to claim 1, wherein:
said joint has said second electrically-conductive material, which comprises, in particular, an active hard solder—preferably, a Zr—Ni—Ti alloy; and
said joint forms a section of said second conductor.

14. The pressure measurement cell according to claim 1, wherein:

said counter body has a diaphragm-side end face and a rear face facing away from the measuring diaphragm that have an axial distance from each other; and said first conductor extends over at least 80% of said axial distance.

15. The pressure measurement cell according to claim 14, wherein:

said first conductor runs along an outer surface of said counter body, which outer surface extends between the diaphragm-side end face and the rear face.

16. The pressure measurement cell according to claim 14, wherein:

said galvanic contact of said first thermocouple is arranged on an outer surface of said counter body.

17. The pressure measurement cell according to claim 14, wherein:

said counter body has a through hole or a blind hole between the diaphragm-side end face and the rear face; and said first conductor runs inside the hole or the blind hole.

18. The pressure measurement cell according to claim 1, wherein:

said galvanic contact of said first thermocouple is arranged on a surface of said counter body facing towards the measuring diaphragm;

the surface of said counter body facing towards the measuring diaphragm has a radius wherein said galvanic contact is at a distance of no more than a fifth of the radius from the outer surface of said counter body.

19. The pressure measurement cell according to claim 1, wherein:

said electrical converter is a capacitive converter that has a diaphragm electrode arranged on the measuring diaphragm and at least one counter body electrode arranged on the diaphragm-side face of said counter body; and the capacitance between the diaphragm electrode and said counter body electrode depends upon a pressure-dependent deformation of the measuring diaphragm, wherein said counter body electrode comprises said first or said second material.

20. The pressure measurement cell according to claim 1, wherein:

at least one conductor of said first and/or said second thermocouple is deposited on said counter body by sputtering.

21. The pressure measurement cell according to claim 1, wherein: said joint has a material thickness; said galvanic contact of said first thermocouple is separated from one of the surfaces of said membrane facing said ceramic counter body by no more than ten times the second material thickness.

22. The pressure measurement cell according to claim 1, wherein: said first material is selected from a list that includes the following materials: sub-stoichiometric metal oxides and Si compounds.

23. The pressure measurement cell according to claim 1, wherein: said first material is selected from a list that includes the following materials: CuNi, NiV, Ti, TiW, TiBN (N2), TiTiN(N2), ZrNiTi, Ta/TaO, PtCu, Ta/TaO, TiOx, PbTe(SrTe)4Na2, Bi2Te3-Sb2Te3, Cu(2-x)Se, SrTiO3, SiGe.

24. The pressure measurement cell according to claim 1, wherein: said first material has a Seebeck coefficient, with respect to Pt, whose magnitude amounts to not less than 16 µV/K and/or the difference between the Seebeck coefficient of said first material and the Seebeck coefficient of said second material has a magnitude that amounts to not less than 16 µV/K.

25. The pressure measurement cell according to claim 1, wherein:

said first material has a Seebeck coefficient, with respect to Pt, whose magnitude amounts to not less than 64 µV/K and/or the difference between the Seebeck coefficient of said first material and the Seebeck coefficient of said second material has a magnitude that amounts to not less than 64 µV/K.

26. The pressure measurement cell according to claim 1, wherein: said second conductor has several sections of different electrically-conductive materials, wherein the amount of the difference between the Seebeck coefficients of the respective adjacent, electrically-conductive materials of said second conductor amounts to no more than a quarter of the amount of the difference between the Seebeck coefficient of the first material and the Seebeck coefficient of the second material; and/or said third conductor has several sections of different electrically-conductive materials, wherein the amount of the difference between the Seebeck coefficients of electrically-conductive materials of said third conductor amounts to no more than a quarter of the amount of the difference between the Seebeck coefficients of said first material and the Seebeck coefficients of said third material.

27. The pressure measurement cell according to claim 1, wherein: said counter body has a diaphragm-side end face and a rear face facing away from the measuring diaphragm that have an axial distance from each other; and said first conductor extends over at least 95% of said axial distance.

28. A pressure-measuring detector, comprising:

a pressure measurement cell; a ceramic counter body; a ceramic measuring diaphragm which is joined in a pressure-tight manner to said ceramic counter body, forming a measurement chamber between said ceramic counter body and said ceramic measuring diaphragm, via a circumferential joint said ceramic measuring diaphragm can be deformed by a pressure to be measured; an electrical converter for converting a pressure-dependent deformation of said ceramic measuring diaphragm into an electrical signal; and a temperature transducer for providing at least one electrical signal dependent upon a temperature or upon a temperature gradient of the pressure measurement cell, wherein: in that said temperature transducer comprises at least one first thermocouple having a galvanic contact between a first conductor, which comprises a first electrically-conductive material, and a second conductor, which comprises at least a second electrically-conductive material that contacts said first conductor; and a housing, wherein:

said housing has, in its interior, a measurement cell chamber in which said pressure measurement cell is arranged;

said housing has a media port; and said ceramic measuring diaphragm faces the media port and can be acted upon via the media port by a medium whose pressure is to be measured.

29. The pressure-measuring detector according to claim 28, wherein:

said media port is surrounded by an annular seal seat; and a seal ring is arranged between said seal seat and the pressure measurement cell, said pressure measurement cell is clamped in an axial direction against said seal ring by a clamping device.

30. The pressure-measuring detector according to claim 28, having a pressure measurement cell comprising said first thermocouple and said second thermocouple are connected in series, wherein:
- the pressure-measuring detector is arranged in such a manner that after a temperature jump of a fluid medium of at least +80 K, before which the medium had an initial temperature of 300 K+/−10 K, and the pressure-measuring detector was found to be in thermal equilibrium with the medium and the environment said counter body has an inhomogeneous temperature distribution, with sites of maximum temperature and minimum temperature;
- said first thermocouple and said second thermocouple are arranged in such a manner that, over a time span of 60 seconds to 600 seconds after the temperature jump, the difference between a current first temperature at the site of said galvanic contact of said first thermocouple and a current second temperature at the site of said galvanic contact of said second thermocouple amounts to not less than 20% of the difference between the current maximum temperature and the current minimum temperature.

\* \* \* \* \*